UNITED STATES PATENT OFFICE.

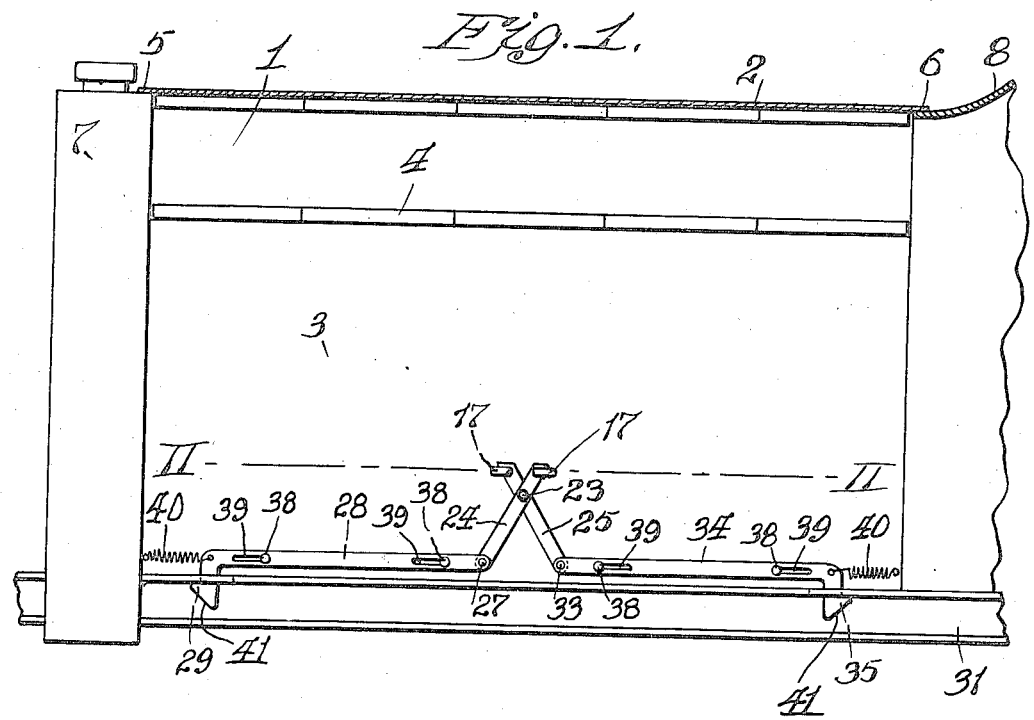

EVERETTE W. H. ROBERTSON, OF ST. LOUIS, MISSOURI.

AUTOMATIC FASTENING AND RELEASING DEVICE FOR AUTOMOBILE HOODS.

1,402,964. Specification of Letters Patent. Patented Jan. 10, 1922.

Application filed July 12, 1920. Serial No. 395,534.

*To all whom it may concern:*

Be it known that I, EVERETTE W. H. ROBERTSON, a citizen of the United States of America, and a resident of the city of St. Louis and State of Missouri, have invented certain new and useful Improvements in an Automatic Fastening and Releasing Device for Automobile Hoods, of which the following is a specification.

The primary object of this invention is to provide an improved securing and releasing device for the movable or demountable portions of automobile hoods.

Another object of the invention is to provide an improved releasing mechanism relative to the movable portions of automobile hoods that is co-operable in conjunction with the lifting handle of the movable portion.

Other and further objects will appear in the specification and be specifically pointed out in the appended claims, reference being had to the accompanying drawings exemplifying the invention, and in which, Figure 1 is a longitudinal vertical section taken through an automobile hood showing this improved automatic fastening and releasing device applied to one of the movable members.

Figure 2 is an enlarged fragmental horizontal section taken on the line II—II of Fig. 1.

Figure 3 is an enlarged transverse section taken on the line III—III of Fig. 2.

Referring to the drawings, the hood 1 of the automobile is provided with the usual top wall 2 and movable side walls 3, one only being shown, said side wall being swingingly secured at its upper edge to the top wall 2 by the hinge 4. The front and rear ends 5 and 6 of the hood are respectively supported by the radiator 7 and dash portion 8.

Extending outwardly from each of the side walls 3 and secured thereto by rivets 9 is a handle 10, said handle being comprised of a pair of hollow legs 11 and a bifurcated cross member or gripping portion 12, and borne by said handle is a U-shaped member 13, having a pair of parallelly arranged extending portions 14, each being mounted in a hollow leg 11, and mounted on each of said extending portions 14 is a spring 15, each of said springs bearing against a respective shoulder 16, each of said shoulders forming part of an actuating portion 17.

The actuating portions 17, are each secured to a respective extending portion 14, by a pin 18, and formed on each of said portions 17 is a cam face 19 which are inclined toward each other. Formed in the gripping portion 12 of the handle 10, is an opening 20, and extending through said opening from the U-shaped member 13 is a projection 21 bearing a finger engaging portion 22.

Pivotally mounted at 23 to each of the walls 3, and on the inner surfaces thereof, is a pair of double acting levers 24 and 25, the upper ends of each of said levers bearing an inclined face 26, each face being engaged by a respective cam face 19 of the actuating portions 17. The lower end of the lever 24 is pivotally secured at 27 to a spring actuated slidable locking bar 28, said bar at its opposite end bearing a catching portion 29 which is operable in a slot 30 formed in the frame member 31, said catching portion 29 adapted to under engage the portion 32 of said member 31.

Pivotally secured at 33 to the lower end of the lever 25 is a spring actuated slidable locking bar 34, said bar at its opposite end bearing a catching portion 35 which is operable in a slot 36 formed in the frame member 31, said catching portion 35 adapted to under engage the portion 37 of the member 31.

The pair of locking bars 28 and 34 are secured to the wall 3 by the pins 38 which are mounted in respective slots 39 formed in said bars, and secured to one end of each of said bars is a coil spring 40, said springs being secured at their opposite ends to the wall 3.

When this improved device is in a locked position relative to securely holding the side walls of the automobile hood, the catching portions 29 and 35 of the respective locking bars 28 and 34 are engaged within their respective slots 30 and 36 of the frame members 31, said catching portions thereby underengaging certain portions of the frame members. When it is desired to fold or lift one of the walls 3 of the hood, the handle 10 is engaged, and as the fingers of the operator are grasped over the finger engaging portion 22, an outward pull is given to the U-shaped member 13, thereby forcing the cam faces 19 of the pair of actuating portions 17 against the inclined faces 26 formed on the upper ends of the respective levers 24 and 25, thereby forcing said upper ends inwardly, and incidentally drawing the lower ends of said levers inwardly, and inwardly pulling the locking bars 28 and 34, whereby the catching portions 29 and 35 of said bars are released from engagement with the portions of the frame member 21 which they underengaged.

On account of the disposition of the finger engaging portion 22, the gripping and lifting motion given to handle 10 produce the releasing effect to the catching portions 29 and 35 as just described. Therefore immediately after the finger engaging portion 22 has been actuated, it is readily seen that a continued lifting motion by the operator will elevate and swing the wall 3.

When the engaging portion 22 has been released, the springs 15 embedded in the handle 10 will return the U-shaped member 13 to its normal position, and the springs 40 will return the locking bars 28 and 34 to their normal positions.

In returning the moved wall 3 to its closed position, the inclined portions 41 of the respective catching portions 29 and 35 will guide said catching portions to their seating and underengaging positions relative to the frame member 31.

From the afore mentioned description of this improved fastening and releasing device, it is to be noted that the releasing operation as well as the lifting operation is simultaneously carried on merely by the automatic gripping and lifting motion of the operator.

What I claim is:—

1. An automobile hood having a movable wall, a handle for moving said wall rigidly secured thereto, a fastening member for said wall, and means carried by the handle bearing a slidable cam surface for forcing the releasing of said fastening member.

2. An automobile hood having a movable wall, a rigid handle fastened to said wall, a locking bar for said wall carried thereby, drawing means for said bar, and reciprocal means borne by said handle provided with a cam surface which is adapted to co-operate with said drawing means for releasing said bar.

3. An automobile hood having a movable wall, a rigid handle secured to said wall, a pair of locking bars for said wall, drawing means for said bars, and there being an actuating mechanism reciprocable within said handle bearing a pair of cam surfaces which are adapted to co-operate with said drawing means for releasing said bars.

4. An automobile hood having a movable wall, a U shaped handle rigidly secured to said wall, a pair of double acting levers carried by said wall, a locking bar secured to one end of each of said levers, and a U shaped reciprocal member borne by said handle bearing a cam surface on each of the extending legs thereof, each of said cam surfaces being co-operable with a respective double acting lever.

5. An automobile hood having a movable wall, a handle for moving said wall rigidly secured thereto, a fastening member carried by said wall having a locking portion, and an actuating mechanism slidable within said handle bearing a driving surface which is co-operable with said fastening member for releasing said locking portion.

6. An automobile hood having a movable wall, a handle for moving said wall rigidly secured thereto, a fastening member carried by said wall having a locking portion, an actuating mechanism slidable within said handle having an extending portion to be engaged by the hand grasp of the operator on said handle, and means co-operable with said actuating mechanism and said fastening member for operating said fastening member and releasing the locking portion thereof of said fastening member.

EVERETTE W. H. ROBERTSON.